US008745069B2

(12) United States Patent
Wurzer et al.

(10) Patent No.: US 8,745,069 B2
(45) Date of Patent: Jun. 3, 2014

(54) CREATION OF A CATEGORY TREE WITH RESPECT TO THE CONTENTS OF A DATA STOCK

(75) Inventors: Joerg Wurzer, Remscheid (DE); Christian Magnus, Wiesbaden (DE)

(73) Assignee: IQser IP AG (CH)

( * ) Notice: Subject to any disclaimer, the term of this patent is extended or adjusted under 35 U.S.C. 154(b) by 211 days.

(21) Appl. No.: 12/941,818

(22) Filed: Nov. 8, 2010

(65) Prior Publication Data
US 2011/0113043 A1 May 12, 2011

Related U.S. Application Data

(63) Continuation of application No. PCT/EP2008/003723, filed on May 8, 2008.

(51) Int. Cl.
*G06F 17/30* (2006.01)

(52) U.S. Cl.
USPC ............ 707/750; 707/E17.001; 707/E17.014; 704/200

(58) Field of Classification Search
USPC ........................................................ 707/750
See application file for complete search history.

(56) References Cited

U.S. PATENT DOCUMENTS

| | | | |
|---|---|---|---|
| 6,411,962 B1 | 6/2002 | Kupiec | |
| 6,999,959 B1 * | 2/2006 | Lawrence et al. | 1/1 |
| 7,047,242 B1 * | 5/2006 | Ponte | 1/1 |
| 7,280,957 B2 * | 10/2007 | Newman et al. | 704/9 |
| 7,630,980 B2 * | 12/2009 | Parikh | 1/1 |
| 7,698,267 B2 * | 4/2010 | Papakonstantinou et al. | 707/999.005 |
| 7,865,495 B1 * | 1/2011 | Roizen et al. | 707/708 |
| 2006/0004732 A1 * | 1/2006 | Odom | 707/3 |
| 2008/0005651 A1 * | 1/2008 | Grefenstette et al. | 715/500 |
| 2010/0223247 A1 * | 9/2010 | Wurzer | 707/706 |

FOREIGN PATENT DOCUMENTS

WO    2005050471 A2    6/2005

OTHER PUBLICATIONS

International Search Report and Written Opinion of the International Searching Authority; PCT/EP2008/003723; Nov. 28, 2008; 13 pages.

* cited by examiner

*Primary Examiner* — Shyue Jiunn Hwa
(74) *Attorney, Agent, or Firm* — St. Onge Steward Johnston & Reens LLC

(57) ABSTRACT

Methods for the automatic creation of a category tree with respect to the contents of a data stock, wherein a taxonomy of the data stock will be created on the base of co-occurrences. Another object of the present invention is furthermore a data processing system comprising data which represent information in at least one data stock which is accessible via at least one data source, which is designed and/or adapted to at least partially carry out a method according to the invention. Another object of the present invention is furthermore a data processing device for the electronic processing of data, comprising a control and/or computer unit, an input unit and an output unit, which is designed and/or adapted to at least partially carry out a method according to the invention, preferably using at least a part of a data processing system according to the invention.

29 Claims, 3 Drawing Sheets

CREATION OF A CATEGORY TREE WITH RESPECT TO THE CONTENTS OF A DATA STOCK

CROSS-REFERENCE TO RELATED APPLICATIONS

The present application is a continuation of pending International patent application PCT/EP2008/003723 filed on May 8, 2008 which designates the United States, the content of which is incorporated herein by reference.

FIELD OF THE INVENTION

The present invention relates to a method for the automatic creation of a category tree with respect to the contents of a data stock respectively data pool comprising information objects, wherein the information objects of the data stock are indexed in an index.

BACKGROUND OF THE INVENTION

The present invention furthermore relates to a method for the automatic creation of a category tree with respect to the contents of all texts of a data stock.

Furthermore, it is an object of the invention to propose a data processing system comprising data which represent information in at least one data stock which is accessible via at least one data source, which is designed and/or adapted to at least partially carry out a method according to the invention.

Furthermore, it is an object of the present invention to propose a data processing device for the electronic processing of data, comprising a control and/or computer unit, an input unit and an output unit, which data processing device is designed and/or adapted to at least partially carry out a method according to the invention, preferably using at least a part of a data processing system according to the invention.

Methods, data processing systems and data processing devices of the initially mentioned type are used within the scope of search applications or routines, for instance by means of operating systems and/or so called search engines as well as within the scope of the organization, provision and/or output of information. Numerous embodiments of methods, systems and devices for the electronic processing of data are known from the state of the art, in particular from WO 2005/050471 A2, the disclosures of which are explicitly referenced herewith.

Usually, contents are mechanically processed as data of a data stock which represent information, in particular in order to be provided and/or serve to users as technical aid for solving problems. Data stocks respectively data pools in the sense of the present invention are simple, universally usable, persistent information or data objects which, like files and/or documents in operating systems or databases, in particular contain structural information, content information and, if required, administrative information.

In data processing systems and/or data processing devices, the data stocks are usually accessible to a data processing system and/or data processing device via at least one data source, usually a data medium, for instance a hard disk or similar data recording means, which is present in a data processing system or can be connected or linked by means of a communication network.

In the hitherto known methods, data processing systems and/or data processing devices, the graphic representation of retrieved results has to be improved with respect to an overview as tool for the applicant or user, in particular with respect to a reference or an overview of the contents of a data stock in search applications or routines, in particular search engines.

Based upon this state of the art it is the object of the invention to provide an applicant or user of methods, data processing systems and/or data processing devices in a simple manner with an overview of the contents of data stocks, in particular with respect to non-structured data stocks and/or data stocks which are difficult to be overviewed.

SUMMARY OF THE INVENTION

For the technical solution, the present invention proposes a method for the automatic creation of a category tree with respect to the contents of a data stock comprising information objects, wherein the information objects of the data stock are indexed in an index, which method is characterized by the following process steps:

1. Filtering out stop words for each information object in the index by means of a list;
2. Creating a list of words in which the stop words which have been filtered out are not contained;
3. Calculating a significance value for each word in the list of words;
4. Sorting the list of words according to the significance by means of the significance value;
5. Reducing the sorted list of words to a maximum number which can be preferably predetermined;
6. Persisting/storing the reduced list of words in a table;
7. Detecting co-occurrences in the persisted/stored list of words;
8. Persisting/storing the co-occurrences in a database;
9. Retrieving words which have the highest significance but no co-occurrences between by means of the table of co-occurrences (co-occurrence table);
10. Selecting the first level of the category tree from the retrieved words;
11. Retrieving words for each selected word of the first level by means of the table of co-occurrences (co-occurrence table), which words are in co-occurrence with the respectively selected word of the first level;
12. Creating a list of words with the retrieved words;
13. Retrieving the frequency of each word on the list of words;
14. Sorting the list of words according to frequency;
15. Reducing the sorted list of words to a preferably pre-determinable maximum number, wherein the words which comprise a frequency above average remain on/in the list of words;
16. Retrieving/selecting another level/a next level of the category tree on the base of/from the retrieved/selected words;
17. Iteratively repeating of the process steps 11 through 16 for at least one other level of the category tree, wherein in process step 11 during the retrieve of words by means of the table of co-occurrences (co-occurrence table), for each selected word of the first and at least one other level, the words will be retrieved which are in co-occurrence with the respectively selected word of the first and at least one other level, until the quantity/number of retrieved/selected words is equal to zero.

An index respectively a database index in the sense of the present invention is an index structure separated from the data structure in a data stock or a database. The index advantageously accelerates the search and/or the sorting according to certain fields. An index is advantageously composed of an accumulation of pointers or links, which define an ordinal relation in one or several columns of a table. If an indexed column is taken as search criterion in a query, the database management system (DBMS) or similar systems will usually search for the desired data records by means of these pointers or links.

A list in the sense of the present invention is a dynamic data structure comprising a limited number of elements. Herein, a memorization of a number of values related to each other of simple and/or composed data types is enabled, which number is not determined in advance.

Stop words in the sense of the present invention are words which will not be considered in a full text indexation, since they occur very often and are usually of no relevance for gathering the contents of a document. Generally common stop words in German documents are for instance certain articles, such as "the", "this" and "that". Stop words in particular stand out for undertaking grammatical and/or syntactic functions and therefore usually do not allow any conclusions with respect to the contents of the document. The non-consideration of stop words provided by filtering them out in particular serves for increasing the efficiency of search engines. If one considered stop words in a search, the amount of results would nearly contain every document of the stock. Such a search result would be useless for the user.

A selection in the sense of the present invention is a selection of data objects from a data amount, in particular in connection with relational databases respectively relational database systems.

An advantageous embodiment of the invention provides that in process step 3 during the calculation of a significance value for each word in the list of words, the significance value will be calculated as the quotient of the word frequency within the information object and the word frequency within the entire index.

Another embodiment of the invention provides that the pre-determinable maximum number in process step 5 will be limited to up to 50.

An advantageous embodiment of the invention provides that in process step 6 during the persisting/storing of the reduced list of words in a table, words in the table will be assigned to the significance value and in case that the significance value is higher than the significance value of an existing/assigned word, the higher significance value will be used.

Another advantageous proposal of the invention provides that in process step 8 during the persisting/storing of the co-occurrences in a database, the database will contain a table of co-occurrences (word 1 and word 2) having a frequency value in a table line, wherein the frequency value will be increased by the factor 1, if a co-occurrence (word 1 and word 2) is already existing in the table.

The pre-determinable maximum number in process step 15 is advantageously limited to up to 20.

According to another advantageous proposal of the invention, the created category tree will be at least partially reproduced/displayed by means of a display device of a computer, preferably in graphic form.

For the technical solution, the present invention furthermore proposes a method for the automatic creation/calculation of a category tree with respect to the contents of all texts of a data stock, which method is characterized by the following process steps:

1. Creating sets of words having a preferably pre-determinable number of significant words for each text of the data stock;
2. Persisting/storing the respective set of words in a relational database in form of a list of words, wherein the words are respectively linked/assigned to an identifier of the respective/related set of words;
3. Creating/retrieving a list of words from the persisted/stored sets of words;
4. Selecting the first level of the category tree from the words of the created/retrieved list of words;
5. Retrieving co-occurrences for each word in the list of words within the sets of words persisted/stored in the database;
6. Persisting/storing the co-occurrences in a database in form of/as a list of words;
7. Retrieving/selecting another level/a next level of the category tree on the base of/from the retrieved/selected list of words;
8. Retrieving co-occurrences for each word combination of the first and the at least one other level of the category tree with other words of the list of words within the sets of words persisted/stored in the database;
9. Persisting/storing the co-occurrences in a database in form of/as a list of words;
10. Iteratively repeating the process steps 7 through 9 for at least one other level/next level of the category tree until the number of the words retrieved in process step 8 for each combination of words of the first and the at least one other level/next level of the category tree with other words of the list of words within the sets of words persisted/stored in the database is equal to zero.

Another embodiment of the invention provides that the list of words created/retrieved in process step 3 will be at least partially reproduced/displayed by means of a display device of a computer, preferably in graphic form.

Another advantageous embodiment of the invention is characterized in that the list of words created/retrieved in process step 3 will be sorted in a descending manner according to the frequency of the respective words, such that the most important terms are directly placed at the beginning of the list of words.

Another advantageous embodiment of the invention provides that in process step 5 during the retrieval of co-occurrences in the persisted/stored list of words, each word on/of the list of words will be compared one after the other to the words of each set of words.

Another advantageous embodiment of the invention is characterized in that the list of words persisted/stored in process step 6 will be at least partially reproduced/displayed by a display device of a computer, preferably in graphic form.

Advantageously, the category tree will be consolidated for the reproduction/displaying by means of a display device, wherein preferably a similarity check will be realized.

An especially advantageous proposal of the invention is characterized in that within the scope of the similarity check, words having different word endings but the same word stem (radical) will be summarized in the shortest possible variant (word form).

Within the scope of the similarity check, two words having different lengths will be advantageously compared to each other, in that the longer word will be shortened by two letters, the shorter word will then be brought to the length of the other word and both words will then be checked on a concordance/match.

Another advantageous embodiment of the invention is characterized in that during the retrieve of co-occurrences in process step 5 and/or process step 8 a similarity check will be realized, wherein words having different word endings but the same word stem will be summarized in the shortest possible variant (word form). Within the scope of the similarity check two words having different lengths will be advantageously compared respectively to each other, in that the longer word will be shortened by two letters, the shorter word will then be brought to the length of the other word and both words will then be checked on a concordance/how they match.

The pre-determinable number in process step 1 is advantageously limited to up to 32.

For the technical solution the present invention furthermore proposes a method for the automatic creation of a category tree with respect to the contents of all texts of a data stock, which method is characterized by the following process steps:

1. Creating sets of words having preferably a pre-determinable number of significant words for each text of the data stock;
2. Persisting/storing the respective set of words in a relational database in form of/as a list of words, wherein the words are respectively linked/assigned to an identifier of the respective/related set of words;
3. Creating/retrieving a list of words from the sets of words;
4. Selecting a first level of the category tree on the base of the words of the created/retrieved list of words;
5. Comparing each word on the list of words to each word within the sets of words persisted/stored in the database, wherein it is checked whether two words coincide/match and/or achieve a certain minimum similarity with respect to each other, and wherein in case of a concordance/match and/or given minimum similarity between the one word and all other words of the sets of words a weighted linkage/link with the weighting/weight 0.1 will be created, wherein the weighting/weight of the linkage/link will be increased by 0.1 if the linkage/link already exists and wherein if a weighting/weight of 1.0 is exceeded, the weighting/weight will be reset to 0.9 and all other linkages/links will be reduced to a value of 90%;
6. Retrieving the linkages/links of each word on the created/retrieved list of words;
7. Persisting/storing the linkages/links in a list of words;
8. Retrieving/selecting another/next level of the category tree on the base of the retrieved linkages/links and/or persisted/stored list of words;
9. Retrieving the linkages/links of each word on/of the created/retrieved list of words and at least one persisted/stored list of words;
10. Persisting/storing the linkages/links in a list of words;
11. Iteratively repeating the process steps 8 through 10 for at least one other level of the category tree until the number of the linkages/links retrieved in process step 9 is equal to zero.

An advantageous embodiment of the invention is characterized in that the list of words created/retrieved in process step 3 will be at least partially reproduced/displayed by means of a display device of a computer, preferably in graphic form.

According to another proposal of the invention, the category tree will be consolidated for the reproduction/displaying by means of a display device, wherein preferably a similarity check will be realized.

Within the scope of the similarity check, words having different word endings but the same word stem will be advantageously summarized in the shortest possible variant (word form).

Another advantageous embodiment of the invention is characterized in that within the scope of the similarity check, two words having different lengths will be respectively compared to each other, in that the longer word will be shortened by two letters, the shorter word will then be brought to the length of the other word and both words will then be checked on a concordance/match.

Another subject of the present invention is furthermore a data processing system comprising data which represent information in at least one data stock which is accessible via at least one data source, which data processing system is designed and/or adapted to at least partially carry out a method according to the invention.

Another advantageous embodiment of the invention is characterized by a graphic user interface for the input and/or reproduction/displaying of lists of words, linkages/links and/or at least one level of at least one category tree. The graphic user interface is advantageously designed and/or adapted for the input, change and/or reproduction/displaying of data which represent information in at least one data stock.

The user interface advantageously provides a graphic user surface which enables an action oriented navigation. The category tree created according to the invention will be advantageously realized in the user surface by a tree structure in which at first the generic terms will be reproduced or displayed and wherein the user can get the associated sub-terms displayed by selecting or activating a button provided for this by the user surface by so called pointing and clicking, the button being displayed with the generic term. In this way, the user can advantageously also move or navigate in other levels of the category tree. If the user now selects a term, advantageously a full text search will be realized via the index with all terms of the selected path in the category tree, for instance a generic term, the sub-term thereof and in turn the sub-term thereof, by means of a search engine or a search engine system, preferably a system according to WO 2005/050471 A2. Advantageously, it is also possible to only select a generic term for the search.

In another advantageous embodiment of the invention, the reproduction will be at least partially realized in a selectable form, i.e. the reproduced categories of the category tree created according to the invention are for instance themselves a menu point for options of action and/or a linkage in form of a link and can be correspondingly used by selection, for instance by so called "pointing and clicking".

In an especially preferred embodiment of the invention, the data processing system according to the invention will be used for the dynamic organization of information and/or processes, preferably within the scope of software running on a computer.

The data processing system according to the invention is advantageously a component of a database application or can be at least used together with a database application.

Another object of the present invention is furthermore a data processing device for the electronic processing of data, comprising a control and/or computer unit, an input unit and an output unit, which is designed and/or adapted to at least partially carry out a method according to the invention, preferably using at least a part of a data processing system according to the invention.

In another advantageous embodiment of the invention a data processing device for the electronic processing of data, comprising a control and/or computer unit, an input unit and an output unit, will be provided, which is characterized by a use of a data processing system according to the invention.

In an advantageous embodiment of the invention the data processing device is a mobile terminal, preferably a mobile terminal which can be used or operated in mobile networks. It is especially preferred that the data processing device is a mobile phone.

A category tree according to the invention provides the user with an overview over the contents of a data stock, advantageously over unstructured data stocks which are otherwise difficult to be overviewed. Furthermore, facts and/or contexts become transparent. For example, it becomes apparent that the texts of one or more data stocks deal with philosophy and ethics is a discipline within philosophy. Finally, it becomes for instance apparent in or from a stock of philosophical publications who has published something in the field of ethics and thus sometimes also belongs to philosophers. The result of an automatic analysis of the terms in a data stock is a category or term tree according to the invention. Generally, terms which form generic categories are placed at the top. Sub-categories are allocated to the respective generic categories, which sub-categories are in turn allocated to other sub-categories. The branching of the category tree according to the invention can be advantageously continued at pleasure until all significant terms of a data stock have got one or more allocations. According to the invention, the user can now select categories and sub-categories in the tree and obtains a corresponding selection of the data stock. The selection is advantageously based upon a search query which refers to or concerns the terms of the selected path of the category tree. Thanks to the category tree according to the invention, a taxonomy will be advantageously created based upon co-occurrences, i.e. the simultaneous occurrence of words.

BRIEF DESCRIPTION OF THE DRAWINGS

Other details, characteristics and advantages of the invention will be explained in detail in the following by means of the description of the exemplary embodiments represented in the figures of the drawing. Herein.

DETAILED DESCRIPTION OF THE INVENTION

Figure 1:
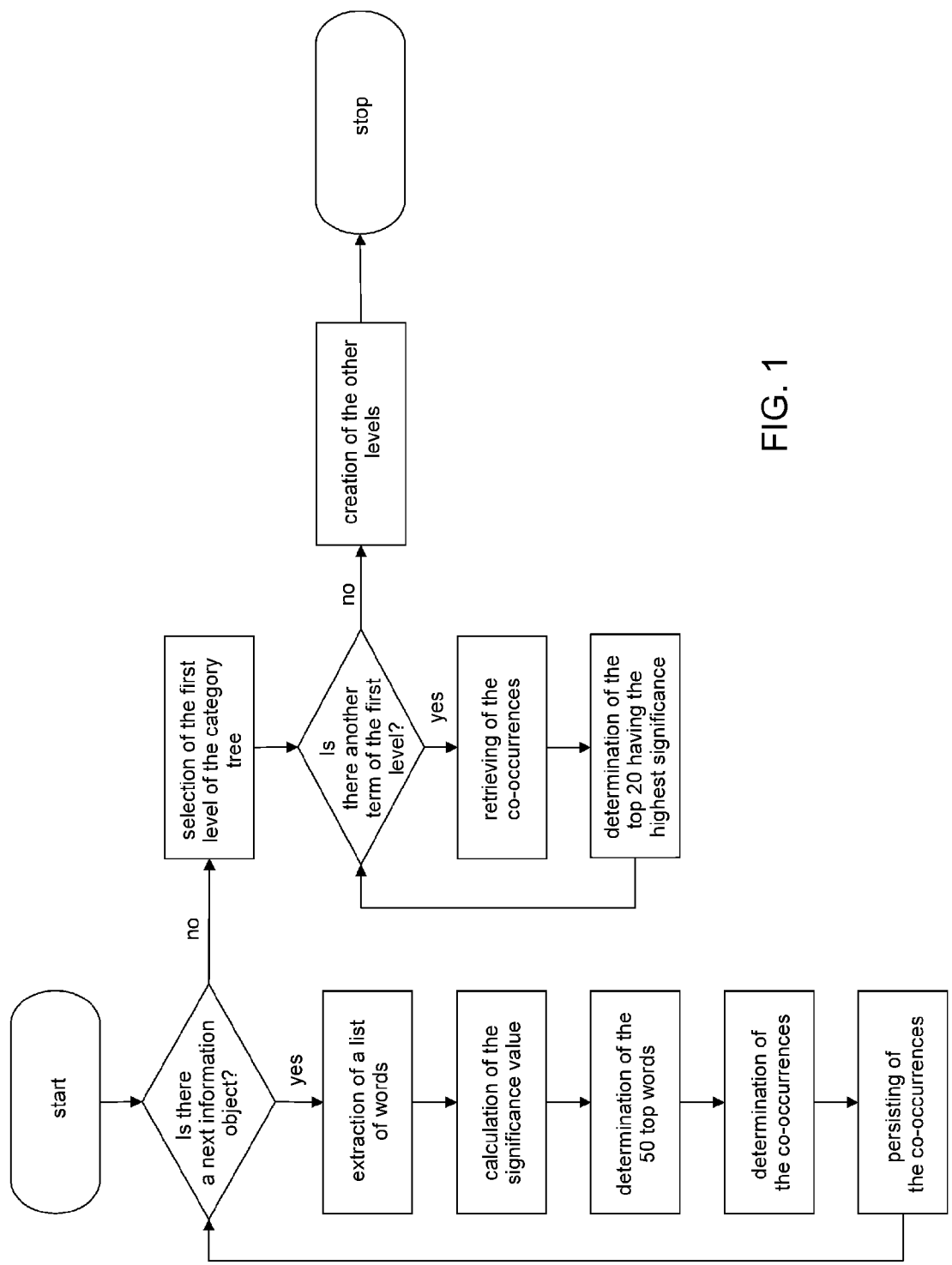
FIG. 1 is a flow chart which shows an exemplary embodiment of a creation according to the invention of a category tree with respect to the contents of a data stock.

In the exemplary embodiment represented in FIG. 1 the creation of a category tree according to the invention with respect to the contents of a data stock is realized as it is visible by means of the flow chart, i.e. as follows:

For each information object in the index, stop words will be filtered out by means of a list and a list of words will be created. There is a significance value for each word. This significance value results from the quotient of the word frequency within the document and the word frequency in the entire index.

The list of words will be sorted according to significance and reduced to the top 50. This value 50 can be configured. The top 50 will be stored in a table. There, words are allocated to the significance value. If the value is higher than an existing one, the higher value will be taken.

The co-occurrences (the simultaneous occurrence of words) will be deduced from this list of words and persisted/stored in a database. In this database there is a table of co-occurrences (word 1 and word 2) with a frequency value in a table line. If there is already a co-occurrence in the table, the frequency value will be increased by 1.

Words will be searched in the co-occurrence table, which have the highest significance, but do not form any co-occurrences (with respect to each other). They form the first level of the category tree.

For all other levels of the category tree, the determined words of the first level will be iterated one after the other. For each word those words will be selected from the co-occurrence table, which form a co-occurrence with the word. Those words are selected from this, which present a frequency over average. This list is limited to 20 and sorted according to frequency.

For all other levels, words will be determined in an analogue manner. On the third level it is only a must that the co-occurrences are given with respect to both words which lead to the third level in the category tree.

Figure 2:
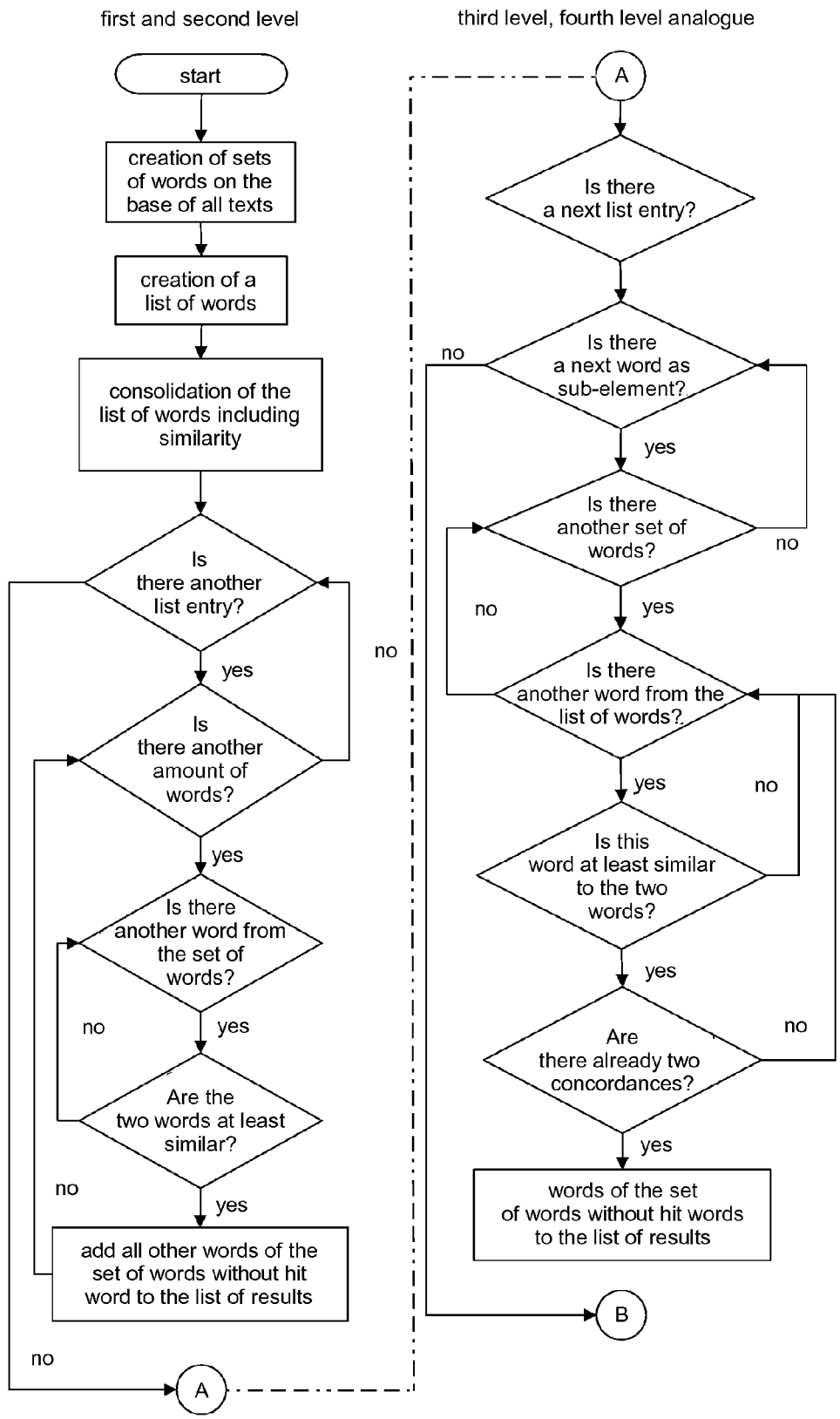
FIG. 2 is a flow chart which shows another exemplary embodiment of a creation according to the invention of a category tree with respect to the contents of a data stock.

In the exemplary embodiment represented in FIG. 2, the creation of a category tree according to the invention with respect to the contents of a data stock, as it is visible in the flow chart, will be realized as follows:

Amounts of words comprising the 32 less frequent words (the significant ones) will be created on the base of all texts and will be respectively memorized in a database. Herein, the amount of words will be memorized in a relational database in form of a list of words, the words of which are linked to an ID of the amount of words. On the base of these amounts of words a list of words will be created, which can be displayed. It forms the first level of the term tree. It is possible to sort this list of words in a descending way according to frequency, such that words having the same meaning, but a different case (casus) and in-flection (flection) form separate categories. Therefore, the term tree can be afterwards consolidated for the display. Words having different endings, but the same stem will be summarized to the shortest variant. Two words of different lengths will be respectively compared to each other in that the longer word is shortened by two letters. The shorter word will then be brought to the length of the other word and checked on a concordance.

For each word of the list of words, co-occurrences (simultaneous occurrence) with respect to other words of the list of words within the amounts of words memorized in the database will be collected. For this purpose, the words of the list of words will be iterated. Each word will be compared to the words of each amount of words. The amounts of words will also be iterated. During the comparison of word to word, similarities will also be considered, as described above. If one of the words coincides, the other words of the amount of words will be added to the list of results. For each word of the first list of words, another list of words will thus be created, which can be consolidated, as described above, and be displayed as second level of the tree.

For each word combination within the category tree, co-occurrences with respect to other words of the first list of words within the amounts of words will be collected. In this case, the words of an amount of words will only be put on a list of results, if both words coincide according to the described similarity. The respective results form the third level of the term tree. The list of results can be consolidated again.

For the fourth level the word combinations can be again chosen as starting point.

Figure 3:
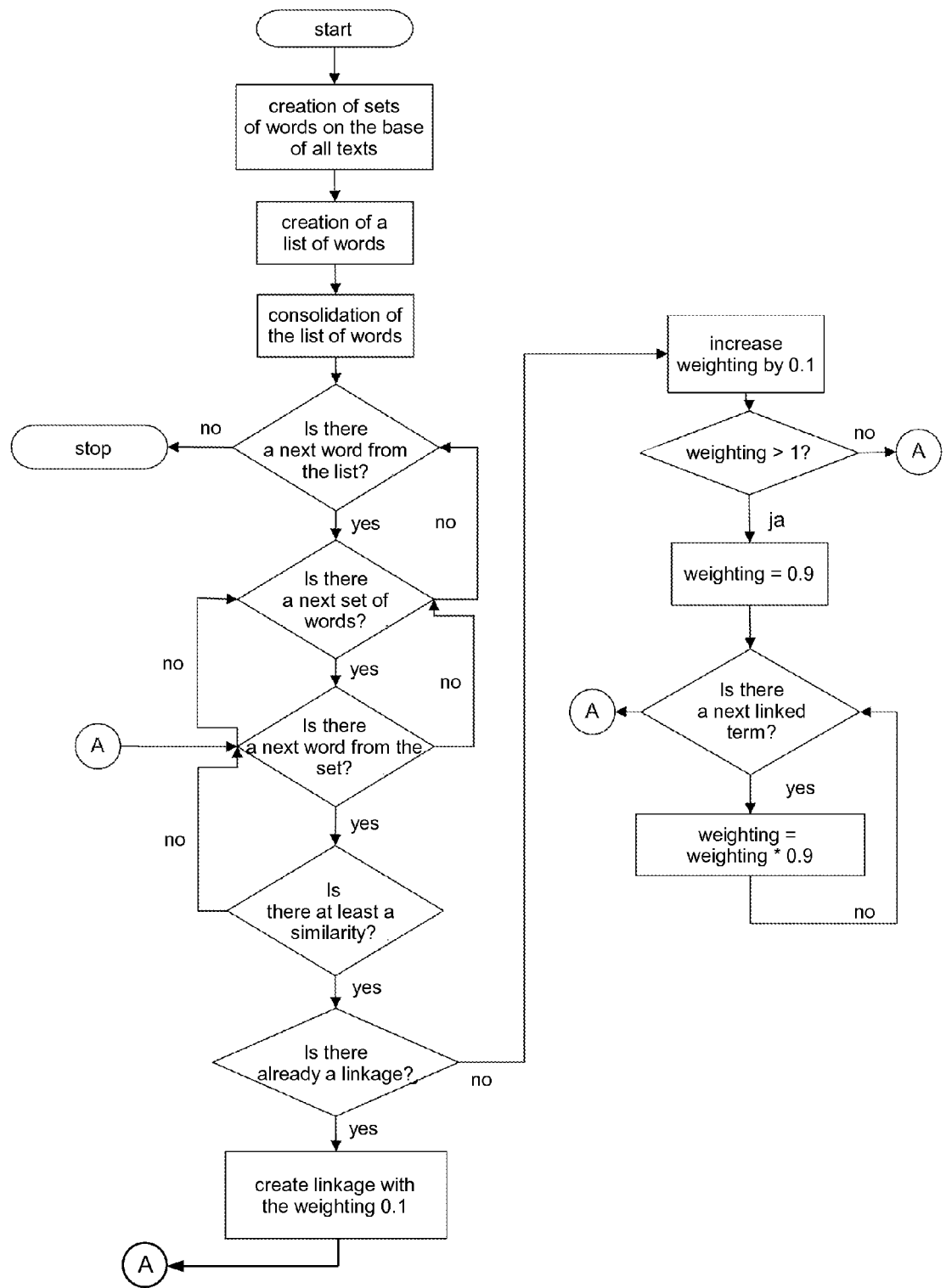
FIG. 3 is a flow chart which shows another exemplary embodiment of a creation according to the invention of a category tree with respect to the contents of a data stock.

In the exemplary embodiment represented in FIG. 3, the creation of a category tree according to the invention with respect to the contents of a data stock, as it is visible in the flow chart, will be realized as follows:

The 32 less frequent words (the significant ones) will be extracted from each text and memorized in a database. A list of words will be extracted from the amounts of words, which list of words corresponds to the first level of the category tree. As already described with respect to the first method, the list can be consolidated.

Afterwards, the list of words will be iterated and each word will be respectively compared to all words of respectively all amounts of words. If two words coincide including the similarity check, a linkage having the weighting 0.1 will be created between the one word and all other words of the amount of words. If this linkage is already existent, the weighting of the linkage will be increased by 0.1. If the value exceeds 1, it will be reset to 0.9 and all the other linkages will be reduced to a value of 90%.

For the second level of the category tree, the linkages will be selected which have been created with respect to a term of the first list of words. This list can again be consolidated according to similarity.

For the third level of the category tree, the linkages will be selected, which are linked to both the first and the second term.

For the fourth level of the category tree, the linkages will be selected, which are linked to the first, the second and the third term.

The exemplary embodiments of the invention represented in the figures of the drawing and explained in connection with the description only serve for explanation of the invention and are not limiting for this one.

What is claimed is:

1. A system for analyzing data to establish a category tree comprising:
   a data source;
   an inventory representation of data in communication with the data source;
   a computer unit having a processor in communication with said data source and said inventory representation of data;
   software executing on said processor to:
   1. create a list of words of each element within the inventory representation of data;
   2. filter out stop words in each of said list of words;
   3. calculate a significance value for each word remaining in each said list of words;
   4. sort said list of words in descending order according to the significance values to create a sorted list of words;
   5. reduce said sorted list of words to a maximum number of top elements to create a reduced list of words;
   6. store said reduced list of words in a persistent memory;
   7. detect co-occurrences within the stored reduced list of words;
   8. store said co-occurrences as a table in the persistent memory;
   9. retrieve words from the stored reduced list of words which have the highest significance values but which have no co-occurrences with each other;
   10. establish a first level of the category tree using said retrieved words;
   11. retrieve a list of co-occurrences for each word of said first level from said stored reduced list of words;
   12. create a corresponding list of words for each said list of co-occurrences having no co-occurrences with each other;
   13. calculate a frequency of co-occurrences for each of said corresponding list of words;
   14. sort said corresponding list of words in descending order according to the frequency to create a sorted corresponding list of words;
   15. reduce said sorted corresponding list of words to a predetermined maximum number of top elements to create a reduced corresponding list of words;
   16. establish a subordinate level of the category tree using said reduced corresponding list of words; and,
   17. iteratively repeat steps 11 through 16 while no further co-occurrences can be retrieved from said persistent memory for a set of superior categories, wherein in step 11 the retrieved co-occurrences exists for all superior categories in said category tree;
   wherein the category tree is consolidated for display on a display device.

2. The system of claim 1, wherein in step 3 the significance value for each word in each said list of words is calculated as the quotient of the relative word frequency within the related data in said inventory representation of data and the relative word frequency within the entire word index.

3. The system according to claim 1, wherein in step 6 during the storing of the reduced list of words as a table, the words in the table will be assigned a significance value, and if the significance value of a given word is higher than the significance value of another instance of the word, the higher significance value will be used, else the significance value will not be modified.

4. The system of claim 1, wherein in step 8 during the storing of the co-occurrences as a table in said persistent memory, said persistent memory will contain a table of co-occurrences having a frequency value in a table line, and wherein the frequency value will be increased by 1, if a co-occurrence already exists in the table, else the initial frequency value will be set to 1.

5. The system of claim 1, wherein the data source is accessible over a network.

6. The system of claim 1, wherein the interface comprises a graphical user interface.

7. The system of claim 1, wherein the inventory representation of data comprises a plurality of elements, each representing either data accessible via the data source or interrelations among the elements.

8. The system of claim 7, wherein said interrelations comprise syntactic interrelations.

9. The system of claim 7, wherein said interrelations comprise semantic interrelations.

10. The system of claim 1, wherein the category tree is consolidated for display on a display device using a similarity check.

11. A system for analyzing data to establish a category tree comprising:
    a data source;
    an inventory representation of data in communication with the data source;
    a computer unit having a processor in communication with said data source and said inventory representation of data;
    software executing on said processor to:
    1. create sets of words having a pre-determinable number of significant words for each text of the inventory representation of data;
    2. store each set of words in a persistent memory as a list of words with an identifier of the related set of words for each word;
    3. retrieve a list of words from each set of words;
    4. establish a first level of the category tree with said retrieved list of words;
    5. retrieve co-occurrences within each set of words stored in said persistent memory for each word in said list of words of the first level of the category tree;

6. store the co-occurrences in said persistent memory as a list of words;
7. establish a subordinate level of the category tree based on the list of co-occurrences;
8: determine co-occurrences for each word combination of the first and each subordinate level of the category tree within the stored sets of words in said persistent memory;
9. store said co-occurrences of each word combinations in said persistent memory;
10. iteratively repeat steps 7 through 9 for subordinated levels of the category tree until no further co-occurrences can be determined in step 8 for each combination of words;

wherein the category tree is consolidated for display on a display device.

12. The system of claim 11, wherein said list of words retrieved in step 3 is at least partially displayed using a display device of a computer.

13. The system of claim 12, wherein said list of words retrieved in step 3 is at least partially displayed in graphic form.

14. The system of claim 11, wherein said list of words retrieved in step 3 is sorted in a descending manner according to the frequency of the respective words.

15. The system of claim 11, wherein in step 5 during the retrieval of co-occurrences in said stored list of words, each word on the list of words will be compared one after the other to the words of each set of words.

16. The system of claim 11, wherein said co-occurrences stored in step 6 is at least partially displayed by a computer display device.

17. The system of claim 16, wherein said list of co-occurrences stored in step 6 is at least partially displayed in graphic form.

18. The system of claim 11, wherein the category tree is consolidated for display on a display device using a similarity check.

19. The system of claim 18, wherein within the scope of said similarity check, words having different word endings but the same word stem will be summarized in the shortest variant.

20. The system of claim 18, wherein within the scope of said similarity check, two words having different lengths will be respectively compared to each other, in that the longer word will be shortened by two letters, the shorter word will then be brought to the length of the other word and both words will then be checked on a concordance.

21. The system of claim 11, wherein determining co-occurrences in step 5 or step 8 a similarity check is used to summarize words having different word endings but the same word stem in the shortest variant.

22. The system of claim 21, wherein within the scope of said similarity check two words having different lengths will be respectively compared to each other, in that the longer word will be shortened by two letters, the shorter word will then be brought to the length of the other word and both words will then be checked on a concordance.

23. The system of claim 11, wherein said pre-determinable number in step 1 is limited to up to 32.

24. A system for analyzing data to establish a category tree comprising:
a data source;
an inventory representation of data in communication with the data source;
a computer unit having a processor in communication with said data source and said inventory representation of data;
software executing on said processor to:
1. create sets of words having a pre-determinable number of significant words for each text of the inventory representation of data;
2. store each set of words in a persistent memory as a list of words, with an identifier of the related set of words for each word;
3. retrieve a list of words from all words in said persistent memory;
4. establish a first level of the category tree with said retrieved list of words;
5. compare each word in said list of words to each word within the sets of words stored in the persistent memory, to determine whether two words match or achieve a predefined minimum similarity with respect to each other, wherein in case of no match of a word in said list of words this word will be skipped, and wherein in case of a match or given minimum similarity between the one word and all other words of said sets of words a weighted link having the weight 0.1 will be created if no link already exists, else the weight of the link will be increased by 0.1 and wherein if a weight of 1.0 is exceeded, the weight will be reset to 0.9 and all other links will be reduced to a value of 90%, else the increased weight will be used;
6. retrieve the links of each word on the retrieved list of words;
7. store the links in a list of words;
8. retrieve a subordinated level of the category tree based on its stored list of words;
9. retrieve the links of each word on the created list of words and at least one stored list of words;
10. store the links in a list of words;
11. iteratively repeat the steps 8 through 10 for subordinated levels of the category tree until the number of the links retrieved in step 9 is equal to zero;

wherein the category tree is consolidated for display on a display device.

25. The system of claim 24, wherein said list of words retrieved in step 3 is at least partially displayed using a computer display device.

26. The system of claim 25, wherein said list of co-occurrences stored in step 3 is at least partially displayed in graphic form.

27. The system of claim 24, wherein the consolidation comprises a similarity check.

28. The system of claim 27, wherein within the scope of said similarity check, words having different word endings but the same word stem will be summarized in the shortest variant.

29. The system of claim 27, wherein within the scope of said similarity check, two words having different lengths will be respectively compared to each other, the longer word will be shortened by two letters, the shorter word will then be brought to the length of the longer word, and both words will then be checked on a concordance.

* * * * *